United States Patent [19]

Fritz et al.

[11] Patent Number: 4,974,999
[45] Date of Patent: Dec. 4, 1990

[54] LOCK FOR A RAILROAD HOPPER CAR OUTLET GATE END TUBE ASSEMBLY

[75] Inventors: William E. Fritz, Naperville; James C. Pankow, Geneva, both of Ill.

[73] Assignee: Gen-Tech, Inc., North Aurora, Ill.

[21] Appl. No.: 440,072

[22] Filed: Nov. 22, 1989

[51] Int. Cl.⁵ .................. B65G 53/24; F16K 35/00; B65G 53/50
[52] U.S. Cl. ............................. 406/145; 70/177; 406/128
[58] Field of Search ............... 406/128, 145; 70/177

[56] References Cited

U.S. PATENT DOCUMENTS 3,162,490 12/1964 Koranda et al. .................. 406/145
4,411,560 10/1983 McComb ............................ 406/145

Primary Examiner—Joseph F. Peters, Jr.
Assistant Examiner—Linda L. Palomar
Attorney, Agent, or Firm—Kinzer, Plyer, Dorn, McEachran & Jambor

[57] ABSTRACT

A lock for the end tube assembly and gate valve for the outlet gate of a railroad hopper car includes an elongated flexible cable and a locking element. The end tube assembly includes an end tube and an end tube cap for closing the end tube. There is a pivotal connection and a latch between the cap the end tube. The latch includes a latch member having an opening therein. The gate valve includes a valve member and an operating handle. The operating handle has an opening therein and is located adjacent to the latch member. The elongated cable, which forms a portion of the lock, passes through the handle opening and the latch member opening and has opposite ends thereof secured together by the locking element.

4 Claims, 2 Drawing Sheets

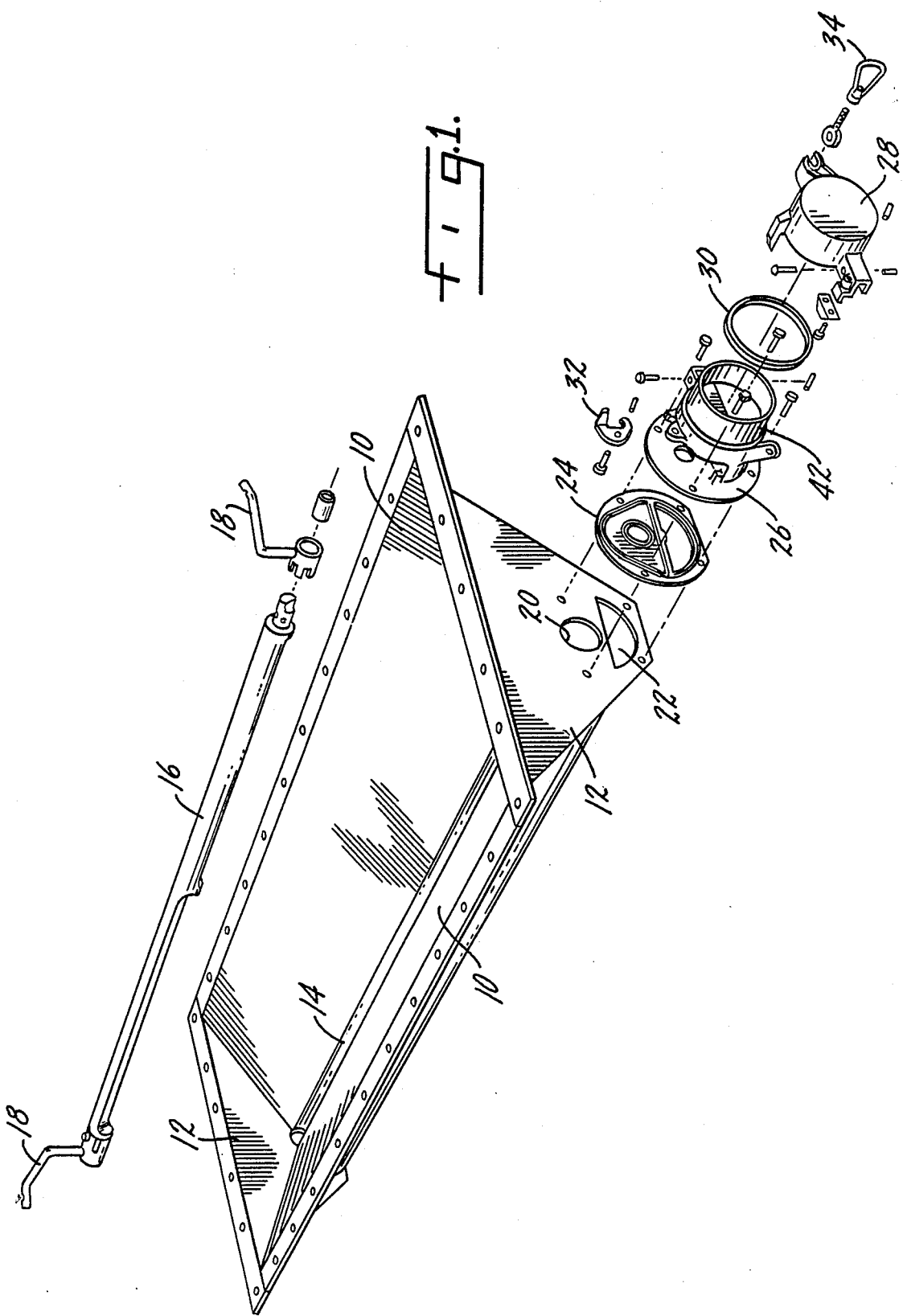

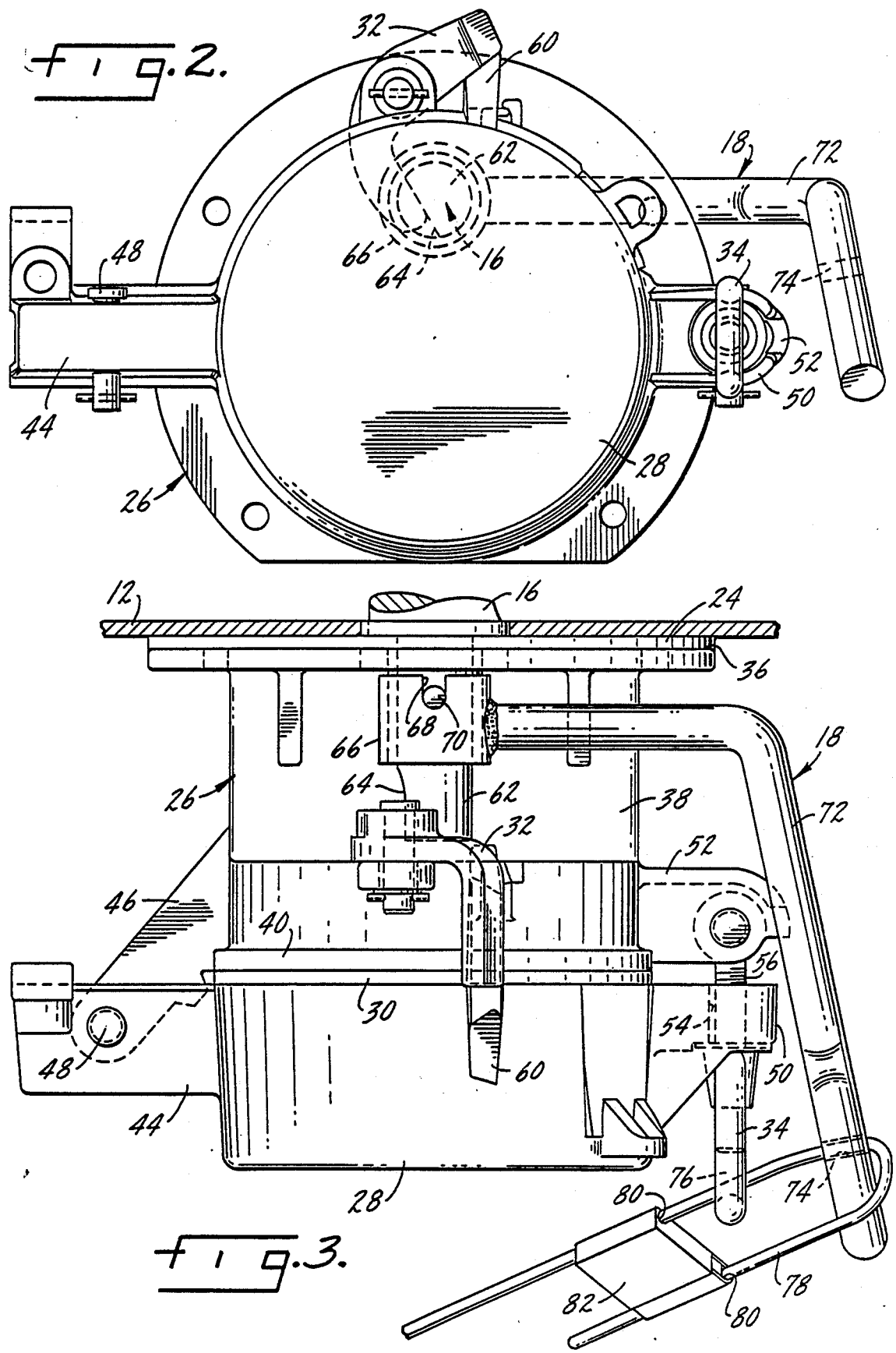

LOCK FOR A RAILROAD HOPPER CAR OUTLET GATE END TUBE ASSEMBLY

SUMMARY OF THE INVENTION

The present invention relates to the outlet gate of a railroad hopper car and in particular to an improved lock or seal which secures both the gate valve and the end tube cap of the end tube assembly.

A primary purpose of the invention is a lock for securing the operating handle of the gate valve and the latch of the end tube assembly so that neither element can be subject to inadvertent opening through vandalism or the like.

Another purpose is a lock for the use described which includes a flexible cable passing through adjacent openings in the gate valve handle and the end tube assembly latch for securing these two elements together.

Other purposes will appear in the ensuing specification, drawings and claims.

BRIEF DESCRIPTION OF THE DRAWINGS

The invention is illustrated diagrammatically in the following drawings wherein:

FIG. 1 is a perspective view, in exploded form, illustrating the parts of the outlet gate of a railroad hopper car;

FIG. 2 is a front view of the end tube assembly; and

FIG. 3 is a top view of the end tube assembly.

DESCRIPTION OF THE PREFERRED EMBODIMENT

FIG. 1 illustrates the various parts of the outlet gate which forms the discharge for a railroad hopper car. The gate includes slanted slope sheets 10 and end sheets or end plates 12 at opposite ends. There is a trough 14 which spans the space between the bottom edges of the slope sheets 10. The outlet gate has an identical discharge at each end and includes a shaft valve 16, operable from either end by handles 18. Shaft 16 extends through a shaft opening 20. There is a discharge opening 22 in each end plate. An end tube seal is indicated at 24 and is in contact with the end plate and has openings which are in alignment with shaft opening 20 and discharge opening 22. Positioned adjacent to the end tube seal is the end tube 26, which has a cap 28 mounted thereto and a cap seal 30. There are various other parts to the end tube structure, including a shaft lock 32 and an eyebolt 34 which is used in locking shaft valve 16 in a predetermined position.

The end tube 26 includes a flat face 36 which bears against the end tube gasket 24. There is a cylindrical section 38 which terminates in a shoulder 40. A tube insert 42 extends outwardly from the end tube and is enclosed by cap 28 when the cap is in the closed position.

Cap 28 has a hinge member 44 by which the cap is hinged to the end tube with the end tube having a hinge member 46. A hinge pin 48 completes the pivotal connection between the end tube and the end tube cap.

The latch which holds the end tube cap in a closed position includes a bracket 50 extending outwardly from one side of cap 28 and an end tube bracket 52 which is in alignment with bracket 50 and pivotally mounts eyebolt 34. Bracket 50 has a slot 54 through which the bolt portion 56 of eyebolt 34 passes when the cap is latched as illustrated in FIG. 3.

Cap 28 includes a guide 60 which extends toward the end tube and is used to coaxially align the end tube cap as it closes. Shaft lock 32 is cammed to the closing position of FIGS. 2 and 3 by guide 60 when the cap is closed on the end tube.

Shaft 16 has a shaft portion 62 which has a flatted area 64 which cooperates with shaft lock 32 to lock the shaft in any particular open or closed position. Handle 18 has a hub 66 with a plurality of slots 68 which cooperate with a pin 70 extending through the end of shaft valve 16 whereby handle 18 may rotate the shaft and may lock the shaft in any given position. The hub 66 and the handle may be axially moved relative to the shaft so that the handle can be rotated without turning the shaft and the hub may be pushed toward the shaft to mate with pin 70 so that the handle may turn the shaft.

Handle 18 has a portion 72 which extends generally along the side of the end tube assembly and in a shaft closed position, extends adjacent to the end tube cap latch and eyebolt 34. Handle portion 72 has an opening 74 which is generally adjacent to the opening 76 in eyebolt 34 when the shaft is in the closed position of FIG. 3.

The lock for securing the handle and the latch to prevent both accidental and vandalized opening of either the gate valve or the end tube assembly includes a flexible steel cable 78 which passes through the adjacent openings 74 and 76 of the handle and eyebolt, respectively, and then passes through spaced and parallel openings or passages 80 in a locking element 82. Thus, the opposite ends of the cable are locked together after the cable has passed through the adjacent openings of the handle and the latch. Neither the handle nor the latch can then be moved. If desired, there may be a bracket on the end tube cap with an opening and the cable may also be passed through such an opening to further secure the described assembly.

Whereas the preferred form of the invention has been shown and described herein, it should be realized that there may be many modifications, substitutions and alterations thereto.

We claim:

1. A lock for the end tube assembly and gate valve of the outlet gate of a railroad hopper car, the end tube assembly including an end tube and an end tube cap for closing the end tube, a pivotal connection between the cap and end tube, a latch between the cap and end tube, the latch including a latch member having an opening therein, the gate valve including a valve member and an operating handle therefor, said handle having an opening therein and being located adjacent to the latch member, said lock, including an elongated member which extends through the opening in the latch member and the opening in the handle, and a locking element securing opposite ends of said elongated member preventing removal thereof from said latch member opening and handle opening.

2. The lock of claim 1 further characterized in that said elongated member is a flexible cable.

3. The lock of claim 2 further characterized in that said locking element has spaced passages therein, with opposite ends of said flexible cable being passed through the locking element passages to secure the cable thereto.

4. The lock of claim 1 further characterized in that said latch member is in the form of an eyebolt.

* * * * *